United States Patent [19]
DePuy

[11] Patent Number: 5,952,855
[45] Date of Patent: *Sep. 14, 1999

[54] CIRCUIT WITH MULTIPLE OUTPUT VOLTAGES FOR MULTIPLE ANALOG TO DIGITAL CONVERTERS

[75] Inventor: Robert P. DePuy, Cherry Hill, N.J.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/775,958

[22] Filed: Jan. 3, 1997

[51] Int. Cl.[6] .................................................. H02M 11/00
[52] U.S. Cl. ............................................. 327/103; 363/13
[58] Field of Search .................................. 327/103, 104, 327/333, 530–531, 538, 541, 543, 544, 77, 78, 80, 81; 363/13, 39

[56] References Cited

U.S. PATENT DOCUMENTS

| | | | |
|---|---|---|---|
| 4,877,953 | 10/1989 | Yamamuro | 250/214 R |
| 5,459,684 | 10/1995 | Nakamura et al. | 365/149 |
| 5,541,828 | 7/1996 | Rozman | 363/21 |
| 5,586,019 | 12/1996 | Mukogawa | 363/93 |
| 5,619,403 | 4/1997 | Ishikawa et al. | 363/21 |
| 5,636,108 | 6/1997 | Taurand | 363/20 |
| 5,654,879 | 8/1997 | Lopez et al. | 363/16 |

Primary Examiner—My-Trang Nuton
Attorney, Agent, or Firm—Thomas M. Blasey; Carl B. Horton

[57] ABSTRACT

A circuit for generating at least two output voltages in response to an input current. A first stage comprises a first impedance for providing a first output voltage when the input current passes through the first impedance. At least a second stage comprises a second impedance coupled to the first impedance, wherein the second impedance provides a second stage voltage when the input current passes through the second impedance. At least a second output voltage is equal to the sum of the second stage voltage and the first output voltage. The second stage further comprises a second stage shunt operable to shunt the input current away from the second impedance when the magnitude of the second output voltage is above a predetermined amount.

6 Claims, 2 Drawing Sheets

5,952,855

CIRCUIT WITH MULTIPLE OUTPUT VOLTAGES FOR MULTIPLE ANALOG TO DIGITAL CONVERTERS

BACKGROUND OF THE INVENTION

1. Field of the Invention

The present invention relates to circuits for use with analog-to-digital converters (ADCS) and, in particular, to circuits that provide multirange output voltages for multiple ADCs.

2. Description of the Related Art

ADCs are used to convert an analog voltage to a digital signal. In some applications, the analog voltage has a magnitude which is proportional to the magnitude of an input signal to be monitored. For example, the input signal may be an input current flowing in a given current path. This input current may drive a primary winding of a current transformer, which produces a current in the secondary winding of the transformer, which is proportional to the input current. The secondary winding current may be applied to a known impedance, such as a resistance, to provide an analog voltage, which has a magnitude proportional to the magnitude of the secondary winding current and, thus, to the magnitude of the input current. The windings of the transformer and value of the resistance may be selected so that the range of the analog voltage for the expected range of the input current will be within the analog voltage input range of an ADC, which in turn converts the analog voltage to a digital signal, which can then be used to monitor the magnitude of the input current.

One problem with such conventional circuits utilizing ADCs is that the input signal to be monitored may have wide magnitude variations, which requires an ADC having a large dynamic range in order to accurately measure the signal's magnitude at both low and high levels. Unfortunately, ADCs capable of measuring a large dynamic range, for example larger than 10 bits, can be relatively expensive and thus unattractive.

Another problem exists in some configurations in which the secondary winding current is forced through a relatively large resistance, which causes a relatively large voltage signal to be produced when the secondary winding current is passed through the resistance. This imposes a large burden on the transformer, which could result in saturation, causing distortion and thus reducing the efficiency and performance of the transformer. Such large voltage signals can also cause damage to the ADC.

SUMMARY OF THE INVENTION

A circuit for generating at least two output voltages in response to an input current. A first stage comprises a first impedance for providing a first output voltage when the input current passes through the first impedance. At least a second stage comprises a second impedance coupled to the first impedance, wherein the second impedance provides a second stage voltage when the input current passes through the second impedance. At least a second output voltage is equal to the sum of the second stage voltage and the first output voltage. The second stage further comprises a second stage shunt operable to shunt the input current away from the second impedance when the magnitude of the second output voltage is above a predetermined amount.

DESCRIPTION OF THE PREFERRED EMBODIMENT

Figure 1:
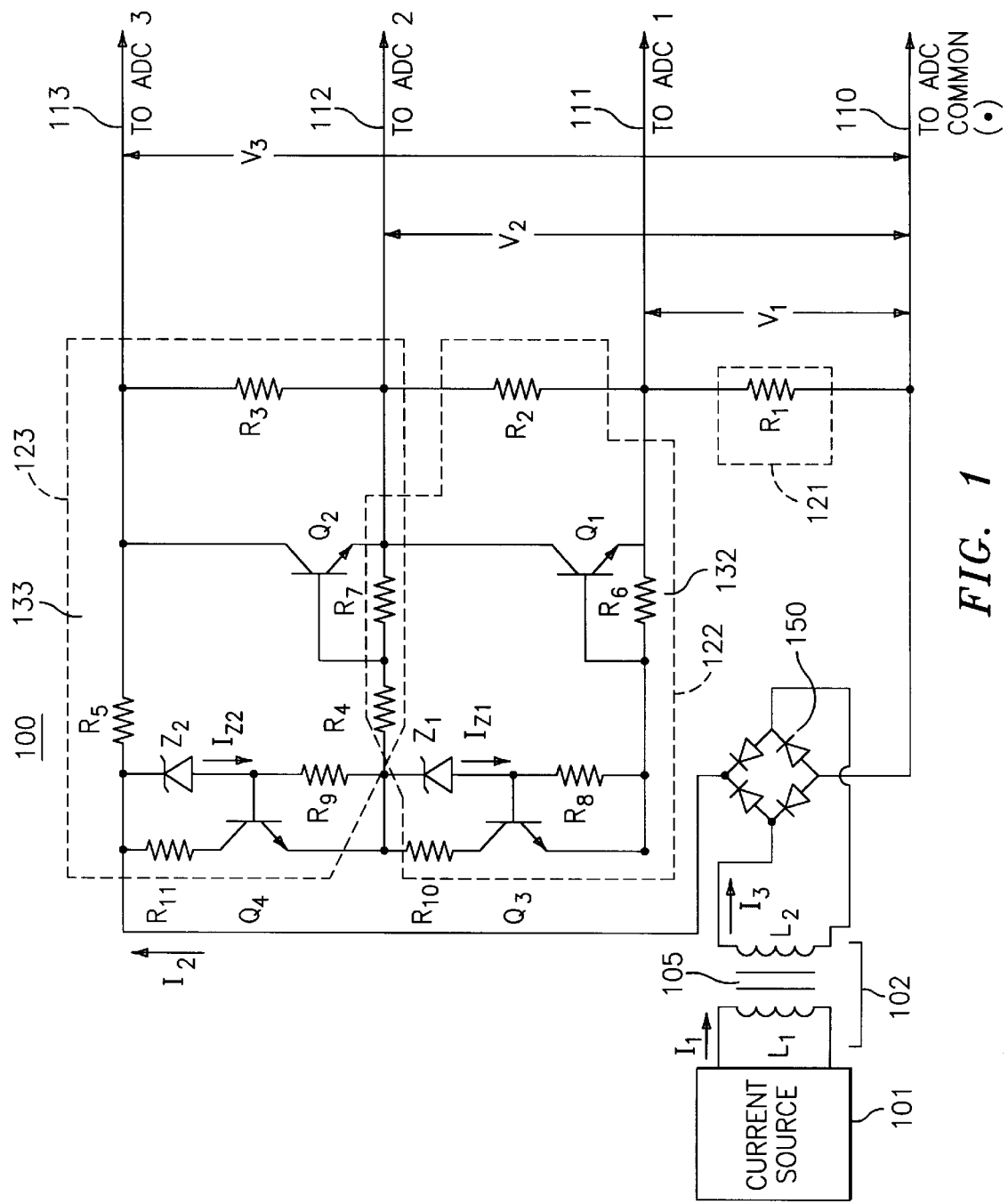
FIG. 1 is a schematic diagram of a circuit in accordance with the present invention.

Referring now to FIG. 1, there is shown a schematic diagram of a circuit 100 in accordance with the present invention. Circuit 100 includes a current transformer 102 having primary winding or coil $L_1$ and secondary winding or coil $L_2$, which have a certain turn ratio to one another. Transformer 102 further includes core 105. Each terminal of secondary winding $L_2$ is coupled to node 110 through a respective diode of bridge rectifier 150.

Circuit 100 further comprises stages 121, 122, and 123. Stage 121 comprises resistor $R_1$, coupled between nodes 110 and 111. Stage 122 comprises resistor $R_2$, coupled at one terminal to node 112, and at its other terminal to node 111, to a terminal of resistor $R_1$, to a terminal of resistor $R_6$, and to the emitter of transistor $Q_1$. Resistor $R_6$ is coupled at its other terminal to the base of transistor $Q_1$, to a terminal of resistor $R_8$, and to the emitter of transistor $Q_3$. Resistor $R_8$ is coupled at its other terminal to the base of transistor $Q_3$ and to the anode of zener diode $Z_1$. The collector of transistor $Q_3$ is coupled to a terminal of resistor $R_{10}$. The other terminal of $R_{10}$ is coupled to the cathode of zener diode $Z_1$ and to a terminal of resistor $R_4$. Resistor $R_4$ is coupled to the collector of $Q_1$, to node 112, and to resistor $R_2$ through resistor $R_7$.

Stage 123 comprises resistor $R_3$, coupled at one terminal to node 113, and at its other terminal to node 112, to a terminal of resistor $R_2$, to a terminal of resistor $R_7$, and to the emitter of transistor $Q_2$. Resistor $R_7$ is coupled at its other terminal to the base of transistor $Q_2$, and to a terminal of resistor $R_4$. Resistors $R_4$ and $R_7$ are thus components of both stages 122 and 123. Resistor $R_4$ is coupled at its other terminal to the cathode of zener diode $Z_1$, to resistor $R_{10}$, to resistor $R_9$, and to the emitter of transistor $Q_4$. Resistor $R_9$ is coupled at its other terminal to the base of transistor $Q_4$ and to the anode of zener diode $Z_2$. The collector of transistor $Q_4$ is coupled to a terminal of resistor $R_{11}$. The other terminal of resistor $R_{11}$ and the cathode of zener diode $Z_2$ are coupled to resistor $R_5$ and to each terminal of secondary winding $L_2$ through a is respective diode of bridge rectifier 150. The other terminal of resistor $R_5$ is coupled to the collector of transistor $Q_2$, to resistor $R_3$, and to node 113.

In one embodiment, the resistors of circuit 100 have the following values: $R_1$=12.5 Ω; $R_2$=187.5 Ω; $R_3$=3 KΩ; $R_4$=866 Ω; $R_5$=13.7 KΩ; $R_6$=10 KΩ; $R_7$=10 KΩ; $R_8$=10 KΩ; $R_9$=10 KΩ; $R_{10}$=82 Ω; $R_{11}$=82 Ω. Zener diodes $Z_1$ and $Z_2$ each have reverse breakdown voltages of 15 V.

First current $I_1$, driven by current source 101, flows through primary winding $L_1$ of transformer 102. A proportional alternating current $I_3$ is thereby generated at secondary winding $L_2$. Alternating current $I_3$ is rectified by bridge rectifier 150 to generate rectified second current $I_2$, which is applied to stage 123 at the junction of resistors $R_{11}$, $R_5$, and zener diode $Z_2$. Secondary winding $L_2$ combined with bridge rectifier 150 is thus a current source that generates second current $I_2$. Circuit 100 outputs three voltages, $V_1$, $V_2$, and $V_3$, at nodes 111, 112, and 113, respectively, each of which is measured with respect to ground or common node 110. Voltages $V_1$, $V_2$, and $V_3$ are analog voltage signals that are applied to ADCs 1, 2, and 3, respectively. Each ADC, in one embodiment, is a 10-bit ADC. Thus, the magnitude of each of voltages $V_1$, $V_2$, and $V_3$ is converted to a 10-bit digital number by its respective ADC at each sampling interval. Each of voltages $V_1$, $V_2$, and $V_3$ thus has a dynamic range of 10 bits. Circuit 100 is configured to provide an 18-bit dynamic range for the measurement of current $I_2$ (and thus of current $I_1$). As will be appreciated, since circuit 100 may be utilized to monitor the magnitude of second current $I_2$ and thus of first current $I_1$, either of currents $I_1$ or $I_2$ may be considered as the input current converted to corresponding voltages $V_1$, $V_2$, and $V_3$ and thus monitored by ADCs 1, 2, and 3. For purposes of the present description, rectified current $I_2$ is considered to be the input current, generated by the current source consisting of secondary winding $L_2$ and rectifier 150, the magnitude of which is to be monitored by ADCs 1, 2, and 3.

To provide an 18-bit dynamic range utilizing three 10-bit ADCs, the magnitudes of voltages $V_1$, $V_2$, and $V_3$ are selected such that $V_3$ is 4 bits, or 16 times ($2^4=16$), larger than $V_2$, and $V_2$ is 16 times larger than $V_1$. For lower magnitudes of current $I_2$, current $I_2$ flows through each of resistors $R_3$, $R_2$, and $R_1$. The values of these resistors are selected so that voltages $V_1$, $V_2$, and $V_3$, at nodes 111, 112, and 113, are progressively larger by factors of 16. Thus, to ensure that $V_2=16$ A $V_1$, the values of the resistors are selected such that $R_2+R_1=16$ A $R_1$. Similarly, to ensure that $V_3=16$ A $V_2$, the values of the resistors are selected such that $R_3+R_2+R_1=16$ A $(R_2+R_1)$. Thus, stages 121, 122, 123 each provide a resistance for current $I_2$ to be multiplied by to provide the appropriate output voltage for that stage. For example, stage 123 provides resistor $R_3$. When current $I_2$ flows through resistor $R_3$, then the incremental voltage produced thereacross, when added to voltage $V_2$ with which it is in series, provides voltage $V_3$, having a magnitude 16 times larger than that of $V_2$.

Figure 2:
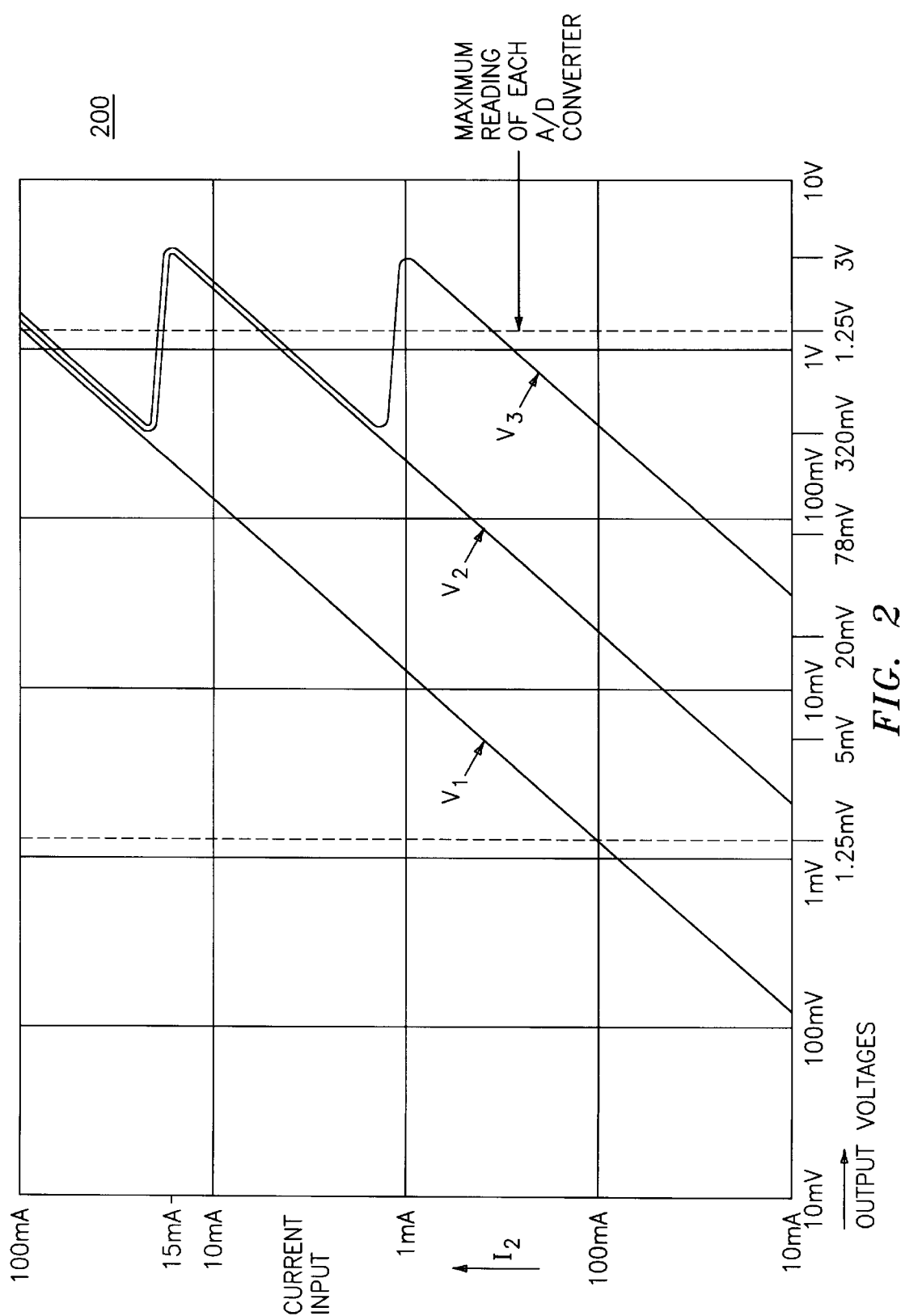
FIG. 2 depicts the output voltages of the circuit of FIG. 1 versus an input current.

Referring now to FIG. 2, there is depicted the output voltages $V_1$, $V_2$, and $V_3$ of circuit 100 of FIG. 1 versus current $I_2$. In one embodiment, each of ADCs 1, 2, and 3 is configured to operate within a range of 50 mV to 1.25 V, the maximum reading of each ADC. At low currents of approximately 100 $\mu$A, $V_1 \approx 1.25$ mV, $V_2 \approx 20$ mV, and $V_3 \approx 320$ mV. Thus, at this current magnitude, the most sensitive reading can be provided by ADC 3 measuring $V_3$. At a higher current $I_2$ magnitude, such as 1 mA, $V_3$ is larger than 1.25 V and is thus too large for ADC 3 to provide an accurate measurement. Thus, at this higher current, the reading of the magnitude of $V_2$ provided by ADC 2 may be utilized. At higher currents, such as 10 mA, ADC 1, which measures $V_1$, may be utilized.

ADCs 1, 2, and 3 may be utilized in this fashion to provide an effective 18-bit resolution measurement of the magnitude of currents $I_2$ and $I_1$. When input current magnitude is lower, greater resolution may be provided by using the lower 10-bits of the 18-bit resolution provided by ADC 3. When input current magnitude is highest, the upper 10-bits of the 18-bit overall resolution may be obtained from ADC 1. As will be appreciated by those skilled in the art, ADCs 1, 2, and 3 may be utilized in this fashion by always selecting the reading from the ADC having the largest-magnitude input voltage that is also not greater than the maximum allowable input voltage for ADCs. For example, a program running on a processor may constantly monitor the reading of $V_1$ provided by ADC 1. Whenever $V_1$ is greater than approximately 78 mV (the point at which $V_2=1.25$ V), ADC 1 will be utilized to measure the input current. Whenever $V_1$ is greater than approximately 5 mV (the point at which $V_3=1.25$ V) but less than approximately 78 mV, ADC 2 will be utilized to measure the input current. Whenever $V_1$ is less than approximately 5 mV, ADC 3 is utilized to measure the input current.

If stages 122 and 123 consisted exclusively of resistors $R_2$ and $R_3$, then, at higher input currents, for example when ADC 1 is utilized to measure $V_1$, voltages $V_2$ and $V_3$ would be 16 and 256 times larger, respectively, than $V_1$. Such large voltages could damage ADCs 2 and 3, and also place an undesirable burden on transformer 102, as explained previously. Therefore, in the present invention, stages 122 and 123 provide shunting means 132 and 133 which shunt most of current $I_2$ away from the stages' respective resistors $R_2$ and $R_3$. In stage 122, shunting means 132 consists of the components of stage 122 other than resistor $R_2$. In stage 123, shunting means 133 consists of the components of stage 123 other than resistor $R_3$. As illustrated in FIG. 2, at an input current $I_2$ of approximately 1 mA, voltage $V_3$ is approximately 3 V, and, as input current $I_2$ increases, voltage $V_3$ starts to "fold back" to a voltage having a slightly larger magnitude than that of $V_2$ by the time input current $I_2$ is approximately 1.3 mA, since most of current $I_2$ is shunted by shunting means 133 so that it no longer passes through $R_3$. Similarly, at an input current $I_2$ of approximately 15 mA, voltage $V_2$ is approximately 3 V, and, as input current $I_2$ increases, voltage $V_2$ starts to fold back to a voltage having a slightly larger magnitude than that of $V_1$ by the time input current $I_2$ is approximately 20 mA, since most of current $I_2$ is shunted by shunting means 132 so that it no longer passes through $R_2$.

Shunting means 133 and 132 operate as follows, as will be appreciated by those skilled in the art. At current $I_2$ magnitudes below 1 mA, both shunting means are "off," and thus allow $I_2$ to pass through resistors $R_3$ and $R_2$. When shunting means 133 and 132 are off, their constituent zener diodes and transistors are off, and the shunting means appear as open circuits to current $I_2$. As current $I_2$ reaches and begins to exceed 1 mA, the voltage drop across resistor $R_5$ becomes high enough such that the voltage at the terminal of resistor $R_5$ coupled to the cathode of zener diode $Z_2$ turns on $Z_2$, causing current $I_{z2}$ to flow therethrough. Current $I_{Z2}$ flows through resistor $R_9$, causing a voltage drop thereacross which turns on transistor $Q_4$.

Current thus flows through transistor $Q_4$ and thence through $R_4$ and $R_7$. The voltage drop across $R_7$ is sufficient to turn on transistor $Q_2$, which thus shunts away from $R_3$ most of current $I_2$, causing the voltage $V_3$ to "fold back" as illustrated in FIG. 2. At this point, $V_3$ is slightly larger than $V_2$.

Most of current $I_2$ thus flows through $Q_2$ instead of through $R_3$ for current magnitudes above approximately 1.3 mA. At this point none of the current from $Q_4$ flows down into shunting means 132, since $Q_3$ and $Z_1$ of shunting means 132 are off because the voltage across $R_2$ is insufficient to allow current to flow through zener diode $Z_1$. Transistor $Q_1$ thus remains turned off, and current $I_2$ flows through stage 123 and thence through resistors $R_2$ and $R_1$, to develop voltages $V_2$ and $V_1$, as before. As current $I_2$ reaches and begins to exceed 15 mA, the voltage drop across resistor $R_4$ becomes high enough such that the voltage at the terminal of resistor $R_4$ coupled to the cathode of zener diode $Z_1$ turns on $Z_1$, causing current $I_{z1}$ to flow therethrough. Current $I_{Z1}$ flows through resistor $R_8$, causing a voltage drop thereacross which turns on transistor $Q_3$. Current thus flows through transistor $Q_3$ and thence through $R_6$. The voltage drop across $R_6$ is sufficient to turn on transistor $Q_3$, which thus shunts away from $R_2$ most of current $I_2$, causing the voltage $V_2$ to "fold back" as illustrated in FIG. 2. At this point, $V_2$ is slightly larger than $V_1$.

Resistors $R_4$ and $R_5$, along with zener diodes $Z_1$ and $Z_2$, are the principal components of circuit 100 that set the fold back points, or maximum voltages, for ADCs 2 and 3, respectively. Resistors $R_{10}$ and $R_{11}$ are used to reduce the power loss in transistors $Q_3$ and $Q_4$ at higher current levels.

Thus, circuit 100 is a circuit for generating output voltages $V_1$, $V_2$, and $V_3$ in response to an input current $I_2$. In one embodiment, circuit 100 comprises a first stage 121 comprising a first impedance $R_1$ for providing a first output voltage $V_1$ when the input current $I_2$ passes through the first impedance $R_1$, and a second stage 122. Second stage 122 comprises a second impedance $R_2$ and a second stage shunt means 132, wherein the second impedance $R_2$ provides a second stage voltage $V_{R2}=(V_2-V_1)$ when the input current $I_2$ passes through the second impedance $R_2$ and the second stage shunt means 132 is for shunting the input current $I_2$ away from the second impedance $R_2$ when the input current $I_2$ is above a predetermined amount (in the example given above, 15 mA). The second impedance $R_2$ is coupled to the first impedance $R_1$ so that the second stage voltage $V_{R2}$, when added to the first output voltage $V_1$, provides a second output voltage $V_2$. The second stage shunt means 132 preferably comprises a transistor $Q_1$ for shunting the input current $I_2$ away from the second impedance $R_2$. The second output voltage $V_2$ is preferably a predetermined multiple (e.g., 16) of the first output voltage $V_1$.

In further embodiments, additional stages may be added, such as third stage 123. Third stage 123 comprises a third impedance $R_3$ and a third stage shunt means 133, wherein the third impedance $R_3$ provides a third stage voltage $V_{R3}$ when the input current $I_2$ passes through the third impedance $R_3$ and the third stage shunt means 133 is for shunting the input current away from the third impedance when the input current is above a second predetermined amount (e.g., 1 mA), wherein the third impedance is coupled to the second impedance so that the third stage voltage $V_{R3}$, when added to the second output voltage $V_2$, provides a third output voltage $V_3$. Thus, circuit 100 of the present invention provides for reduced power requirements and a reduced burden on the transformer. Central processing units (CPUs) having multiple 10-bit ADCs are also relatively inexpensive, so that the current invention provides for a larger dynamic ADC range than is possible with a single ADC, at a lower cost.

Those skilled in the art will appreciate that alternative embodiments of the present invention may utilized a number of stages other than three. For example, a four-stage circuit may be utilized with four ADCs and four output voltages, in which three of the four stages provide a resistor and a shunting means. Additionally, in alternative embodiments, ADCs having a resolution other than 10-bits may be utilized. ADCs may also be combined with overlaps other than 4 bits, to provide an effective resolution other than 18 bits. For example, three 10-bit resolution ADCs may be utilized, with voltages $V_1$, $V_2$, and $V_3$ separated by a factor of 32 (5 bits) rather than 16 (4 bits), for an overall resolution of 20 bits instead of 18 bits.

Alternatively, three 12-bit resolution ADCs may be utilized, with voltages $V_1$, $V_2$, and $V_3$ separated by a factor of 16, for an overall resolution of 20 bits instead of 18 bits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A circuit for generating at least two variable output voltages in response to a variable input current, the circuit comprising:

(a) a first stage comprising a first impedance for receiving the variable input current from a variable current source and for providing a first output voltage when the variable input current passes through the first impedance; and (b) at least a second stage comprising a second impedance coupled to the first impedance, wherein the second impedance provides a second stage voltage when the variable input current passes through the second impedance, further wherein at least a second output voltage is equal to the sum of the second stage voltage and the first output voltage, the second stage further comprising a second stage shunt operable to automatically shunt the variable input current away from the second impedance while still applying the variable input current to the first impedance, when the magnitude of the second output voltage is above a predetermined amount.

2. The circuit of claim 1, wherein the second output voltage is a predetermined multiple of the first output voltage.

3. The circuit of claim 1, further comprising:

(c) a third stage comprising a third impedance coupled to the second impedance, wherein the third impedance provides a third stage voltage when the input current passes through the third impedance, further wherein a third output voltage is equal to the sum of the third stage voltage and the second output voltage, the third stage further comprising a third stage shunt operable to shunt the input current away from the third impedance when the magnitude of the third output voltage is above a second predetermined amount.

4. The circuit of claim 1, wherein the second stage shunt comprises a transistor for shunting the input current away from the second impedance.

5. The circuit of claim 4, wherein:

the first impedance is a first resistor and the second impedance is a second resistor;

the second stage shunt further comprises a means for turning on the transistor when the input current is above the predetermined amount;

the transistor has base, collector, and emitter terminals; and the emitter terminal of the transistor is coupled to the junction of the first and second resistors, the collector terminal is coupled to the other terminal of the second resistor, and the base of the transistor is coupled to the means for turning on the transistor.

6. The circuit of claim 5, wherein the means for turning on the transistor comprises third, fourth, and fifth resistors, a second transistor having base, collector, and emitter terminals, and a zener diode having anode and cathode terminals, wherein the third resistor is coupled between the base and emitter terminals of the transistor, the base terminal of the transistor is coupled to the emitter of the second transistor and through the fourth resistor to the base of the second transistor and the anode of the zener diode, and the collector of the transistor is coupled through the fifth resistor to the collector of the second transistor and the cathode of the zener diode.

* * * * *